Figure 1:
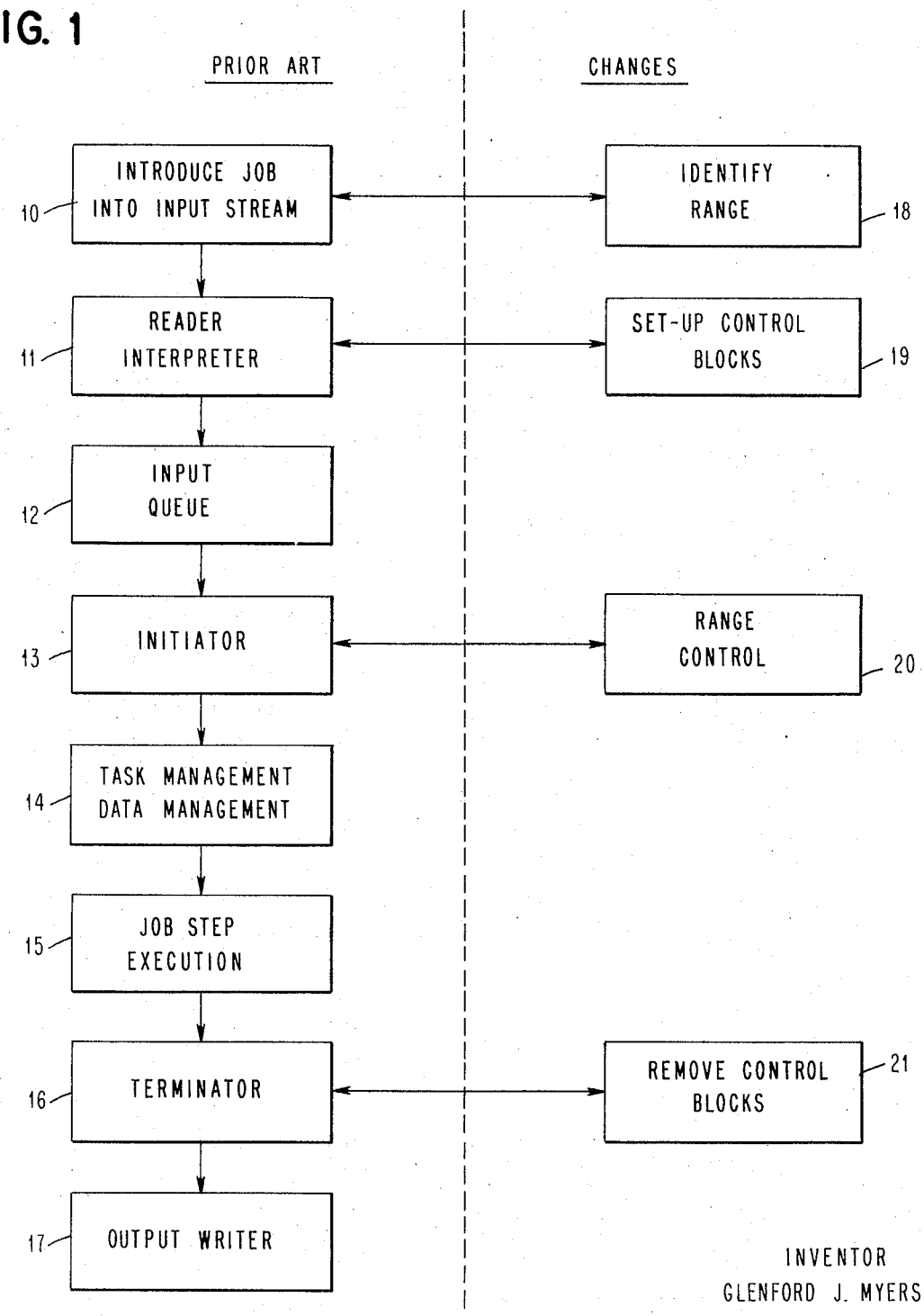
Figures 2, 3, 4:
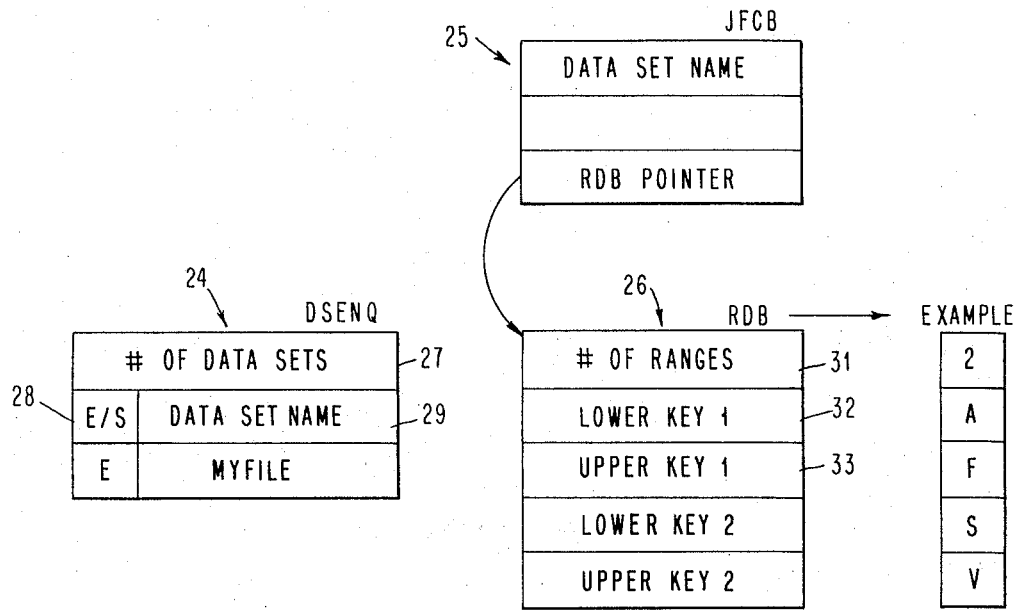
Figure 5A:
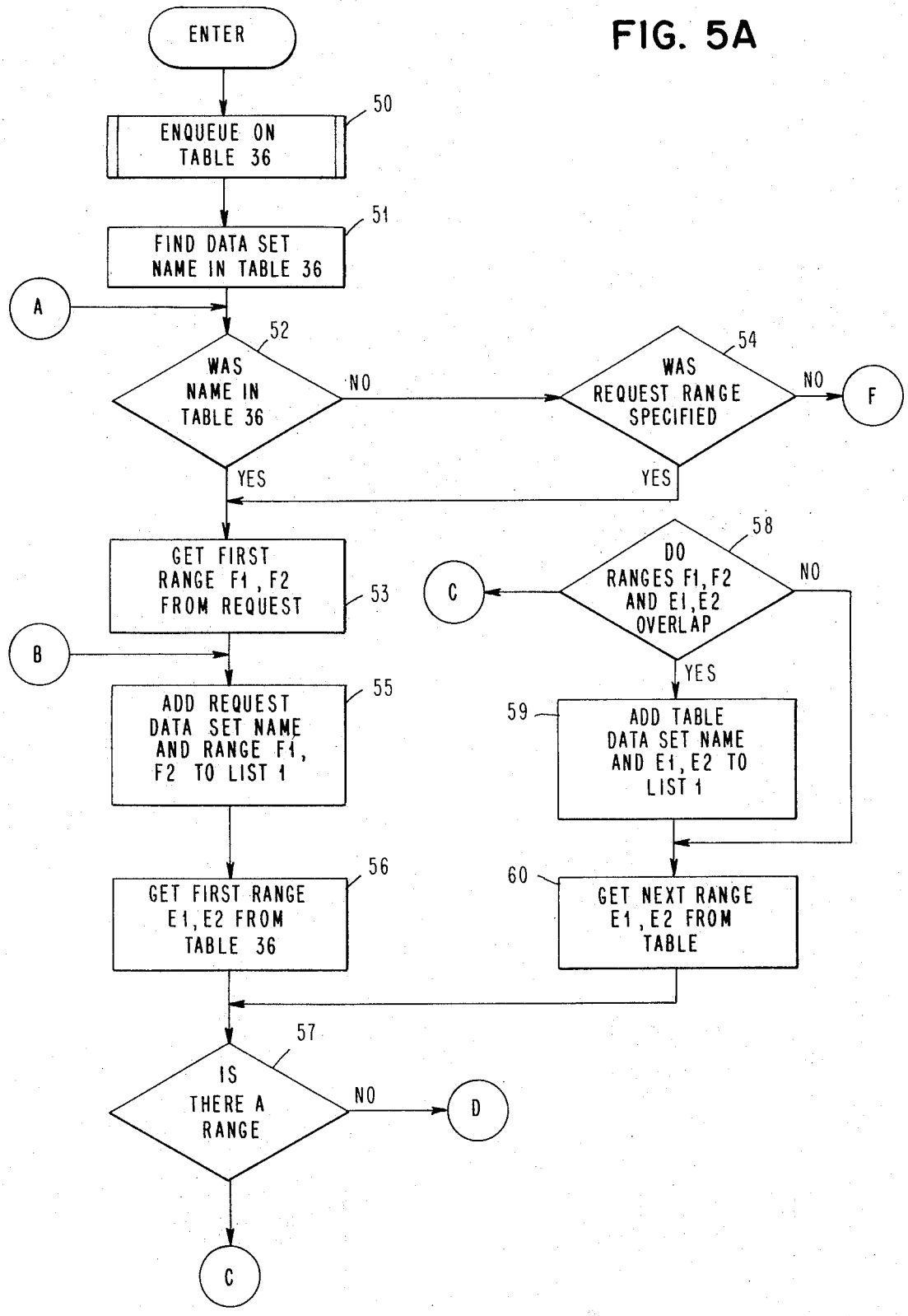
Figure 5B:
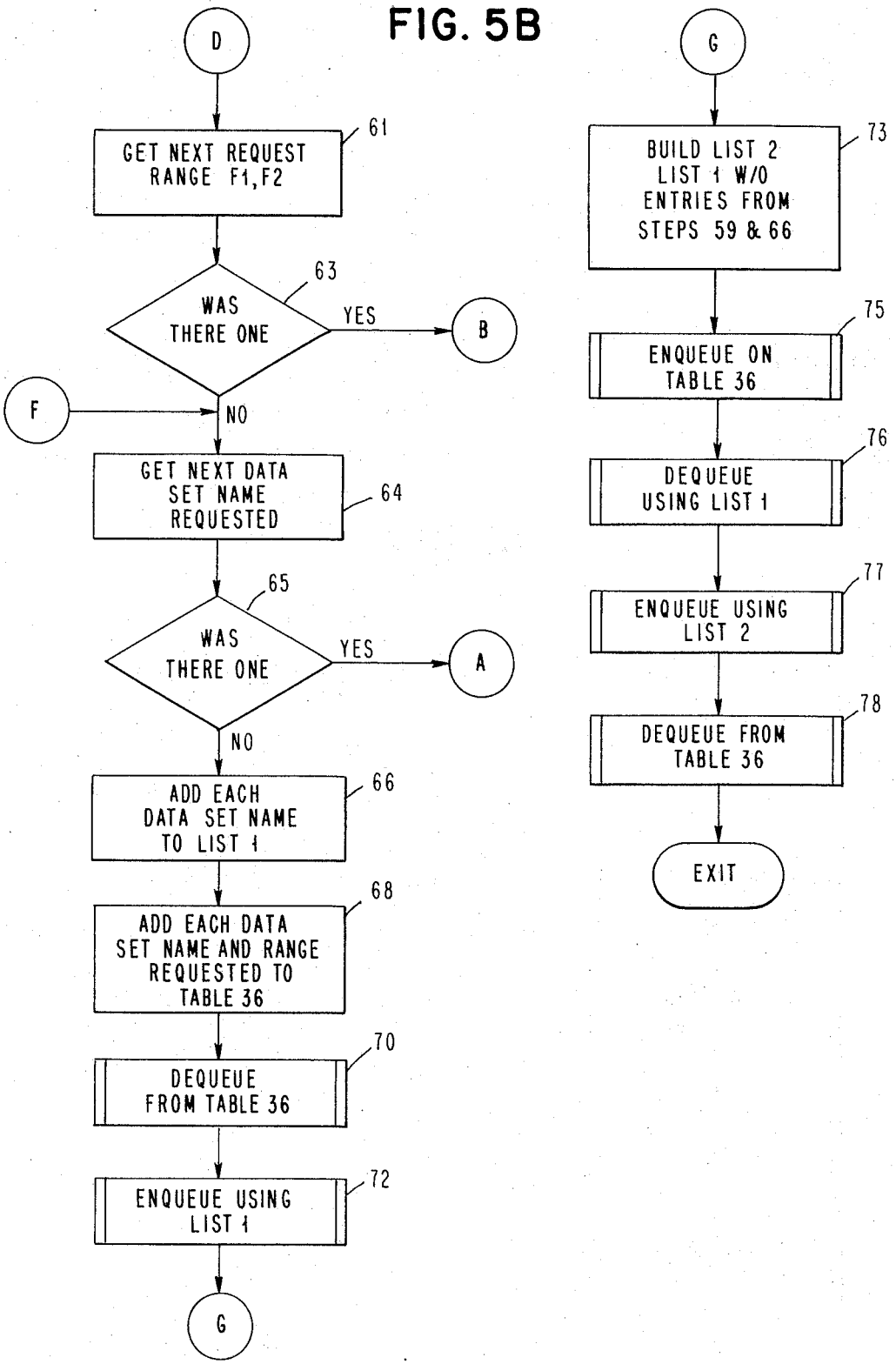

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 12

T920,015
METHOD FOR CONTROLLING USE OF RANGES IN A DATA SET

Glenford J. Myers, Poughkeepsie, N.Y., assignor to International Business Machines Corporation, Armonk, N.Y.

Continuation of application Ser. No. 138,053, Apr. 28, 1971. This application Aug. 13, 1973, Ser. No. 387,865
**Int. Cl. G06f *9/18***
U.S. Cl. 444—1
4 Sheets Drawing. 19 Pages Specification

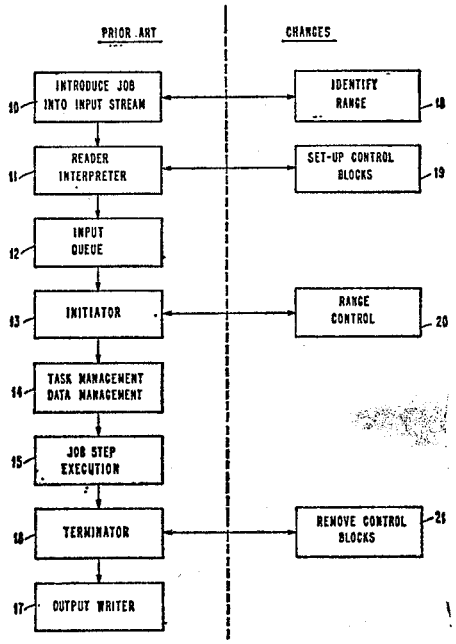

In a data processing system operating in a multiprogramming mode, one or more ranges of data items in a data set, can be used by two or more concurrently operating programs on an exclusive basis or a shared basis. As a job is placed in the input stream of the system, information identifying the ranges and data sets is placed in tables. During job initiation, a central resource table is checked for entries from previously initiated jobs to see if there is any conflicting request. Parameter lists are built and the resources, i.e., the ranges of the data sets, are enqueued upon using the system's supervisory program. If there is no conflict, the resources are allocated. Otherwise, the initiator is placed in a wait state until the resources are freed.

METHOD FOR CONTROLLING USE OF RANGES IN A DATA SET

Original Filed April 28, 1971 4 Sheets-Sheet 1

INVENTOR
GLENFORD J. MYERS

BY Douglas R. McKechnie

ATTORNEY

METHOD FOR CONTROLLING USE OF RANGES IN A DATA SET

Original Filed April 28, 1971 4 Sheets-Sheet 2

36 38 39 TABLE

37

| DATA SET NAME | LOWER KEY | UPPER KEY |
|---|---|---|
| MYFILE | A | F |
| MYFILE | S | V |

42 43 44 45

LIST 1

| E/S | DATA SET NAME | LOWER KEY | UPPER KEY |
|---|---|---|---|
| E | MYFILE | A | F |
| E | MYFILE | S | V |
| E | MYFILE | | |

LIST 2

| | | | |
|---|---|---|---|
| E | MYFILE | A | F |
| E | MYFILE | S | V |

METHOD FOR CONTROLLING USE OF RANGES IN A DATA SET

Original Filed April 28, 1971 4 Sheets-Sheet 3

METHOD FOR CONTROLLING USE OF RANGES IN A DATA SET

Original Filed April 28, 1971 4 Sheets-Sheet 4